(12) United States Patent
Sokol, Jr.

(10) Patent No.: US 10,565,099 B2
(45) Date of Patent: Feb. 18, 2020

(54) METHODS AND APPARATUS FOR COMPRESSED AND COMPACTED VIRTUAL MEMORY

(71) Applicant: Apple Inc., Cupertino, CA (US)

(72) Inventor: Joseph Sokol, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 81 days.

(21) Appl. No.: 13/730,211

(22) Filed: Dec. 28, 2012

(65) Prior Publication Data

US 2014/0189281 A1  Jul. 3, 2014

(51) Int. Cl.
  *G06F 12/02* (2006.01)
  *G06F 3/06* (2006.01)
  *G06F 12/08* (2016.01)

(52) U.S. Cl.
  CPC .......... *G06F 12/023* (2013.01); *G06F 3/0608* (2013.01); *G06F 3/0664* (2013.01); *G06F 3/0685* (2013.01); *G06F 12/08* (2013.01); *G06F 2212/401* (2013.01)

(58) Field of Classification Search
  CPC .................. G06F 2212/401; G06F 12/0638
  See application file for complete search history.

(56) References Cited

U.S. PATENT DOCUMENTS

| | | | | |
|---|---|---|---|---|
| 4,829,422 A | * | 5/1989 | Morton | G06F 8/45 712/E9.032 |
| 5,699,539 A | * | 12/1997 | Garber | G06F 12/023 360/8 |
| 5,721,823 A | * | 2/1998 | Chen | H04N 7/17336 348/E7.073 |
| 5,727,232 A | * | 3/1998 | Iida | G06F 3/061 710/56 |

(Continued)

FOREIGN PATENT DOCUMENTS

| | | | |
|---|---|---|---|
| CN | 1484151 A | 3/2004 | |
| EP | 1429502 A2 | * 6/2004 | ............. H04L 47/18 |

OTHER PUBLICATIONS

Merriam Webster Dictionary definition of "via"; Published by Encyclopedia Britannica; p. 1.*

(Continued)

*Primary Examiner* — Paul M Knight
(74) *Attorney, Agent, or Firm* — Womble Bond Dickinson (US) LLP (57) ABSTRACT

A method and an apparatus for a memory device including a dynamically updated portion of compressed memory for a virtual memory are described. The memory device can include an uncompressed portion of memory separate from the compressed portion of memory. The virtual memory may be capable of mapping a memory address to the compressed portion of memory. A memory region allocated in the uncompressed portion of memory can be compressed into (Continued)

the compressed portion of memory. As a result, the memory region can become available (e.g. after being compressed) for future allocation requested in the memory device. The compressed portion of memory may be updated to store the compressed memory region. The compressed memory region may be decompressed back to the uncompressed portion in the memory device in response to a request to access data in the compressed memory region.

30 Claims, 5 Drawing Sheets

(56) References Cited

U.S. PATENT DOCUMENTS

| | | | |
|---|---|---|---|
| 6,040,953 A * | 3/2000 | Malone | G11B 5/012 360/25 |
| 6,148,368 A * | 11/2000 | DeKoning | G06F 12/0866 710/53 |
| 6,173,381 B1 | 1/2001 | Dye | |
| 6,473,842 B1 * | 10/2002 | Tsutsumi | 711/159 |
| 6,523,102 B1 | 2/2003 | Dye et al. | |
| 6,886,085 B1 * | 4/2005 | Shuf | G06F 9/30047 711/143 |
| 7,412,466 B1 | 8/2008 | Garthwaite | |
| 7,533,228 B1 | 5/2009 | Garthwaite | |
| 7,587,572 B1 | 9/2009 | Stenstrom | |
| 8,145,833 B1 | 3/2012 | Duan | |
| 8,161,206 B2 | 4/2012 | Benveniste et al. | |
| 9,652,568 B1 * | 5/2017 | Tzelnic | G06F 17/5022 |
| 2001/0044880 A1 * | 11/2001 | Franaszek | G06F 12/023 711/117 |
| 2002/0138669 A1 | 9/2002 | Kadatch et al. | |
| 2002/0147893 A1 * | 10/2002 | Roy et al. | 711/154 |
| 2004/0030813 A1 * | 2/2004 | Benveniste | G06F 3/0608 710/22 |
| 2004/0109463 A1 * | 6/2004 | Friesen | H04L 47/18 370/402 |
| 2005/0135159 A1 * | 6/2005 | Inoue | G06F 5/10 365/189.05 |
| 2006/0101223 A1 * | 5/2006 | Lekatsas | G06F 12/0802 711/173 |
| 2007/0005911 A1 * | 1/2007 | Yang | G06F 12/023 711/154 |
| 2008/0189558 A1 * | 8/2008 | Hughes | G06F 21/80 713/193 |
| 2009/0112949 A1 | 4/2009 | Ergan et al. | |
| 2009/0222796 A1 * | 9/2009 | Keohane | G06F 11/3636 717/128 |
| 2009/0284551 A1 * | 11/2009 | Stanton | G06F 3/14 345/629 |
| 2009/0327621 A1 | 12/2009 | Kliot et al. | |
| 2010/0036858 A1 * | 2/2010 | Patel | G06F 17/30067 707/822 |
| 2011/0107054 A1 | 5/2011 | Hepkin et al. | |
| 2012/0036325 A1 * | 2/2012 | Mashtizadeh et al. | 711/118 |
| 2012/0072683 A1 * | 3/2012 | Iliadis | G06F 12/0246 711/159 |

OTHER PUBLICATIONS

The Authoritative Dictionary of IEEE Standards Terms; Seventh Edition; Published 2000; p. 574.*
DB2 Basics: Table spaces and buffer pools by Ani Patel; Published Apr. 22, 2010.*
The Design and Implementation of a Log-Structured File System by Rosenblum and Osterhout; ACM 1992.*
TCP Maximum Segment Size (MSS) and Relationship to IP Datagram Size by Kozierok; As published on the internet Dec. 2010 at http://www.tcpipguide.com/free/t_TCPMaximumSegmentSizeMSSandRelationshiptoIPDatagra-2.htm.*
The Working Set Model for Program Behavior by Peter Denning_MIT, May 1968.*
The PC Guide: Hard Disk and Cache Circuitry by Charles Cozierok 2004; as published at http://www.pcguide.com/ref/hdd/op/cache.htm.*
LINLOGFS_A Log Structured File System for Linux 2000 by Czezatke (Year: 2000).*
Write Activity Reduction on Flash Main Memory 2010 by Shi (Year: 2010).*
Optimizing Memory Transactions by Harris Microsoft (Year: 2006).*
FASTM: A Log-based Hardware Transactional Memory with Fast Abort Recovery by Lupon (Year: 2009).*
The Design and Implementation of a Log-structured File System by Rosenblum (Year: 1992).*
International Search Report and Written Opinion of the International Searching Authority for corresponding International Application No. PCT/US2013/071753, dated Jun. 11, 2014, 20 pages.
Toni Cortes et al., "Swap Compression: Resurrecting Old Ideas", Software Practice & Experience, XP-000908375, Wiley & Sons, Bognor Regis, vol. 30, No. 5, Apr. 25, 2000, pp. 567-587.
International Preliminary Report and on patentability (Chapter 1) from the International Bureau for corresponding International Application No. PCT/US2013/071753, dated Jul. 9, 2015, 14 pages.
Fourth Office Action for corresponding Chinese Patent Application No. 201380068367.0 with English translation containing Chinese Search Report in English, 27 pp., (dated Mar. 5, 2019).
Third Office Action for corresponding Chinese Patent Application No. 201380068367.0 with English translation containing Chinese Search Report in English, 26 pp., (dated Oct. 9, 2018).

* cited by examiner

METHODS AND APPARATUS FOR COMPRESSED AND COMPACTED VIRTUAL MEMORY

FIELD OF INVENTION

The present invention relates generally to memory systems. More particularly, this invention relates to compressed and/or compacted memory for virtual memory systems.

BACKGROUND

Virtualization techniques have been developed to enhance memory management for memory space having a size exceeding actual physical capacity of a memory device. Typically, memory virtualization can be based on memory swapping using a storage device coupled to the memory device. As memory objects and/or IO (input/output) sizes are not deterministic, different sizes or pages of memory which are uncompressed may be swapped in/out between the storage and memory devices. As a result, IO through put and/or latency for transferring stored memory data for the swap memory may negatively impact the performance of the virtual memory system.

Further, the performance of certain storage devices, such as spin based hard disks, may have strong dependency on data locality for memory access to reduce lengthy disk spins. However, data locality may not be guaranteed during runtime as clustering characteristics for memory access vary in different data processing tasks. Thus, memory swapping by paging in/out between the memory device and the storage device to support generic data processing tasks can further degrade the perceived performance of the memory system.

Although the trend of adopting larger and larger sizes of actual physical memory tends to alleviate performance cost in inter device memory swap, certain feature enhancements in data processing systems may be provided without memory size changes. For example, support for higher screen resolution may be imposed on existing devices based on substantially the same amount of memory size. However, a mere two times higher screen resolution may correspond to four times increase in window buffer sizes. As a result, without a compensating increase in physical memory size, the system performance for higher screen resolution may degrade and become visibly slower.

Therefore, traditional implementations of virtual memory systems are not capable of supporting performance requirements constrained by limited physical memory sizes.

SUMMARY OF THE DESCRIPTION

A compressed memory pool dynamically maintained in a memory device can provide an additional layer of support for a virtual memory based on the memory device coupled with a mass storage device. Virtual memory addresses may be paged or mapped into an uncompressed portion of the memory device, the compressed memory pool and/or the storage device. The compressed memory pool may grow and shrink within the memory device without a size limitation for the virtual memory.

In one embodiment, a memory page (e.g. a unit of area of uncompressed memory) may be compressed into a compressed memory unit (or compressed page) in the compressed memory. Multiple compressed memory units may be compacted together as a fixed sized segment in the compressed memory. The segment may be sized for efficient data transfer between the memory device and the mass storage device for swapping in/out segments of compressed memory units to support a virtual memory pager.

In another embodiment, a memory device may include a dynamically updated portion of compressed memory for a virtual memory. The memory device can include an uncompressed portion of memory separate from the compressed portion of memory. The virtual memory may be capable of mapping a memory address to the compressed portion of memory. A memory region allocated in the uncompressed portion of memory can be compressed into the compressed portion of memory. As a result, the memory region can become available (e.g. after being compressed) for future allocation requested in the memory device. The compressed portion of memory may be updated to store the compressed memory region. The compressed memory region may be decompressed back to the uncompressed portion in the memory device in response to a request to access data in the compressed memory region.

In another embodiment, a virtual memory based on a memory device is provided. The memory device can be dynamically partitioned into an uncompressed portion of memory and a compressed portion of memory, such as DRAM (volatile memory). The uncompressed portion of memory can store working data processed via a processor coupled to the memory device. One or more pages of the uncompressed portion of memory can be compressed into one or more varied sized compressed memory units in the compressed portion of memory. The compression can increase available memory space in the uncompressed portion of memory. The compressed memory units can be decompressed back from the compressed portion of memory to the uncompressed portion of memory, for example, in response to a page fault for an access request to data in one of the compressed memory units. At least one of the varied sized compressed memory units can be swapped out from the compressed portion of memory to a mass storage device to increase available memory space in the uncompressed portion of memory.

In another embodiment, one or more memory pages of an uncompressed portion of a memory device can be compressed into one or more varied sized compressed memory units in a compressed portion of the memory device. A mass storage device (such as a magnetic hard drive (HDD) or a composite storage device, treated as one logical volume from a file system's perspective, that includes an HDD and flash memory) can be coupled with the memory device. The varied sized compressed memory units can be compacted into a segment in the compressed portion of the memory device. The one compressed memory unit can be decompressed from the compressed portion to the uncompressed portion of the memory device in response to an access request to one of the compressed memory units. The segment of the compressed memory units may be swapped out to the mass storage device to increase available memory space in the memory device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Methods and apparatuses for compressed and compacted virtual memory are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, a compression pool (or pool of compressed memory units) in a memory device may by managed dynamically using log based data structures (or log structures). Data can be put in the compression pool in a packed and/or compressed manner to shrink required memory space for storing the data. When to swap stored data between the compression pool and a mass storage device (or nonvolatile storage device) may be automatically determined in a self contained compressed memory management system, for example, to insulate a virtual memory system or other applicable memory usage module, from the underlying compression pool.

Memory data may be compressed to reduce swap file size, for example, for data transfer efficiency between a memory device and a swap device such as a mass storage device. Additionally, memory data may be compressed into a compression pool based on efficient memory compression schemes with compression/decompression cost (e.g. in several micro seconds) significantly less (e.g. several orders of magnitudes) than conventional disk swap speed with a swap device. The compression pool may grow in size within the memory device when needed to reduce required swapping operations with the swap device.

For example, the compression pool can grow and work as large as the available physical memory size as long as there is enough memory space left (e.g. a small number of memory pages) to perform memory compression/decompression operations to shift data in/out of the compression pool. A working set may be maintained to fit in the uncompressed portion of memory with varied sizes as the compression pool grows/shrinks. If the working set (e.g. memory allocated for a set of live tasks for data operations of a processor) spills into the compression pool (or compressed portion of memory), memory pages may be pulled (e.g. based on a certain predetermined rate) from the compressed portion to substitute between the compressed and uncompressed portions (or layers) of memory to support the working set. Requests or requirements for additional memory space to allocate may be detected to indicate that the existing working set has spilled over. The working set may be extended via a LRU (least recently used) ordering strategy to select which memory pages to be compressed into the compression pool.

In one embodiment, multiple compression/decompression schemes or mechanisms may be dynamically selected during run time. Each scheme may be based on one or more compression/decompression algorithms. The selection may be made based on a hint or heuristic provided by the creator (e.g. an application or process initiating or requesting allocation) of the memory, or it could be determined by looking in each page of memory about to be compressed for a particular pattern of data. In one embodiment, one of the compression/decompression schemes may be designated as the default one applicable to a majority of allocated memories (e.g. without any hint provided by corresponding memory creators). This scheme would also be used as the default one if a pattern matching mechanism was in play, and no match was made. One candidate that might benefit (e.g. see more efficient compression) from a specialized compression/decompression scheme is the memory created for use by graphics operations (e.g. via a GPU).

In some embodiments, compaction operations may be performed in the compression pool to maintain log structures in the compressed memory segments. For example, compressed data units may be packed together within one compression memory segment (e.g. for minor compaction) and/or across multiple compression memory segments (e.g. for major compaction). Compaction operations may be initiated on requests and/or automatically as compressed data are removed from or stored into the compressed memory. Log structures may allow efficient input/output operations (e.g. read/write operations) on the compression pool within a memory device and/or between coupling storage devices.

According to one embodiment, as compressed data is pulled out from the compression pool, holes (i.e. empty memory space previously occupied by the compressed data) may be created. As a result, memory usage of the compression pool may become less and less efficient if these holes are not removed. Minor compaction operations can be performed to move compressed data within a memory segment (e.g. a log structure) in the compression pool to reduce number of holes in the memory segment. In one embodiment, minor compaction operations may be performed to allow additional allocation of memory pages in the memory device. Minor compaction operations may cost insignificant processing resources to cause noticeable improvement in data processing latency.

In one embodiment, major compaction operations may be performed to move compressed data among different memory segments of the compression pool in addition to minor compaction operations, for example, when there is a need to swap compressed data out to a swap device. The number of memory segments required in the compression pool may be reduced as a result of the major compaction operations. Unused memory space in memory segments of the compression pool may be tightened up (or reduced), for example, to allow writing out large chunks of compressed memory pages to a swap device. As a result, available IO bandwidth (e.g. between the memory device and the swap device) can be maximized. Further, the amount of ware and tear against the swap device (such as a SSD device) can be minimized.

In one embodiment, compaction operations are performed based on a compaction model which determines when to perform minor compaction operations, major compaction operations or other applicable data movement operations to maintain efficient memory storage usage in the compression pool. Minor compaction operations may be performed to shuffle compressed data within one memory segment to increase or release available memory space. Major compaction operations may be performed to move compressed data among multiple memory segments, for example, to ensure readiness to swap out memory segments in full size from the compression pool to a swap device. A memory segment may be in full size if it is substantially without holes or with a memory usage rate greater than, for example, a predetermined threshold (e.g. 99%).

Thus, log structured data (or model) can be maintained when performing IO operations writing to swap files (e.g. in a swap device) from the compression pool, for example, based on same sized chunk of data (e.g. a compression segment), such as 256 KB, 512 KB, 1024 KB or other suitable size. In one embodiment, the chunk of data transferred during the IO operation for memory swapping may correspond to a collection of compression memory pages according to the IO interface with the swap device (e.g. matching an IO bus buffer size) to improve IO performance. Consequently, efficiency or through put in IO operations between the compression pool and the swap device may be improved based on the compression of the data transferred and the matching transfer data chunk size for the swap device.

In one embodiment, log structured data in the compression pool may include an ordered list of memory segments. Newly compressed data may be recorded in the head segment (or recording head) of the ordered segment list. Working set analysis for a virtual memory system may be performed to determine which portion of the compression pool to swap out based on the ordered segment lists in the compression pool. For example, the farther away a segment is located in the ordered list from the head segment, the more likely compressed data stored in the segment may no longer be of interest (or of immediate need) for the working set. As a result, the tail segment (or far end from the recording head) may be selected to be swapped out to a swap device. Compressed data may be brought in/out from the compression pool from/to the swap device based on compacted memory segments.

A need to perform memory swap operations may be identified, for example, to put an upper limit on the size of the compression pool. The size (or shape) of the compression pool may change dynamically based on runtime memory access patterns. In one embodiment, processing cost of compaction/compression/decompression operations vs. memory swap operations may be dynamically monitored (or estimated) based on a cost (e.g. power consumption cost) model to determine when to perform swap operations.

For example, the rate of compression, decompression and/or compaction operations may correspond to power (or processing resource consumption) to indicate health of the compression pool (or compression layer, compression portion) in the memory device. If this rate exceeds a certain threshold, swap operations may be performed or triggered to page out compressed data out of the compression pool to a swap device. In one embodiment, compression/decompression and/or compaction operations may incur a fraction of processing cost compared with data 10 transactions in swap operations. Power cost functions may be evaluated to allow the compression pool to grow before a need arises for paging out compressed data to a swap device. The cost function may depend on, for example, the shape of the compression pool, configured tolerance in processing latency caused by compaction/compression/decompression operations, or other applicable factors to maintain the working set in the memory device.

The compression pool in a memory device may allow power savings by reducing the required number of data paging (e.g. swap operations) to/from a swap device. For example, as data is compressed, less number of data paging or file paging is required. Further, efficiency or effectiveness in each data paging or swap operation can be improved with compacted segments carrying the compressed data via log based structures.

In some embodiments, lists of log structure based memory segments in the compression pool may be ordered corresponding to an age of compressed data stored in each segment. The age of the compressed data may indicate how early the data was compressed from the working set or accessed for the working set. Swap operations may write out memory segments which have been aged (e.g. the tail portions of the ordered segment list) out of the working set. As a result, compressed data selected to be swapped out of the compression pool to a swap device (e.g. disk) may stored in a compacted memory segment which hasn't been used for a while. Swap operations may be performed to, for example, make room for or accommodate growth of the working set. In the meanwhile, periodic data write from the memory device to the swap device or disk device for maintenance purposes (e.g. file or data backup/synchronization) may be avoided or reduced with significant power saving.

The compression pool may provide mechanisms for speedy operations for system hibernation and/or waking up. For example, the compressed portion and uncompressed portion of a memory device may be separately backed up (or stored) in a non-volatile storage device (e.g. a disk) for a system to enter a hibernated (or sleep) state. The compressed portion (or compression pool) may be transferred (or pushed) to the non-volatile storage device via compacted memory segments. The uncompressed portion of the memory (e.g. including a current working set) may be compressed into the compression pool attached with special tags to be transferred to the non-volatile storage device as compacted memory segments. For example, applications may be suspended into the compression pool as compressed/compacted memory segments.

During system waking up, the specially tagged compressed memory segments corresponding to the uncompressed portion of the memory device may be retrieved (or pulled back) from the non-volatile storage device to populate the memory device with the previous working set (or hot working set). For example, suspended applications may be unsuspended or restored back to the uncompressed portion of the memory device from the specially tagged compressed memory segments. Instead of retrieving arbitrary memory pages (e.g. previously stored in either the compressed or uncompressed portions of the memory) associated with the application being restored, the system may be pre-heated (or pre-warmed for accelerated waking up) with valuable information previously stored in the uncompressed portion of the memory for the application before retrieving those memory pages previously stored in the compression pool.

Figure 1:
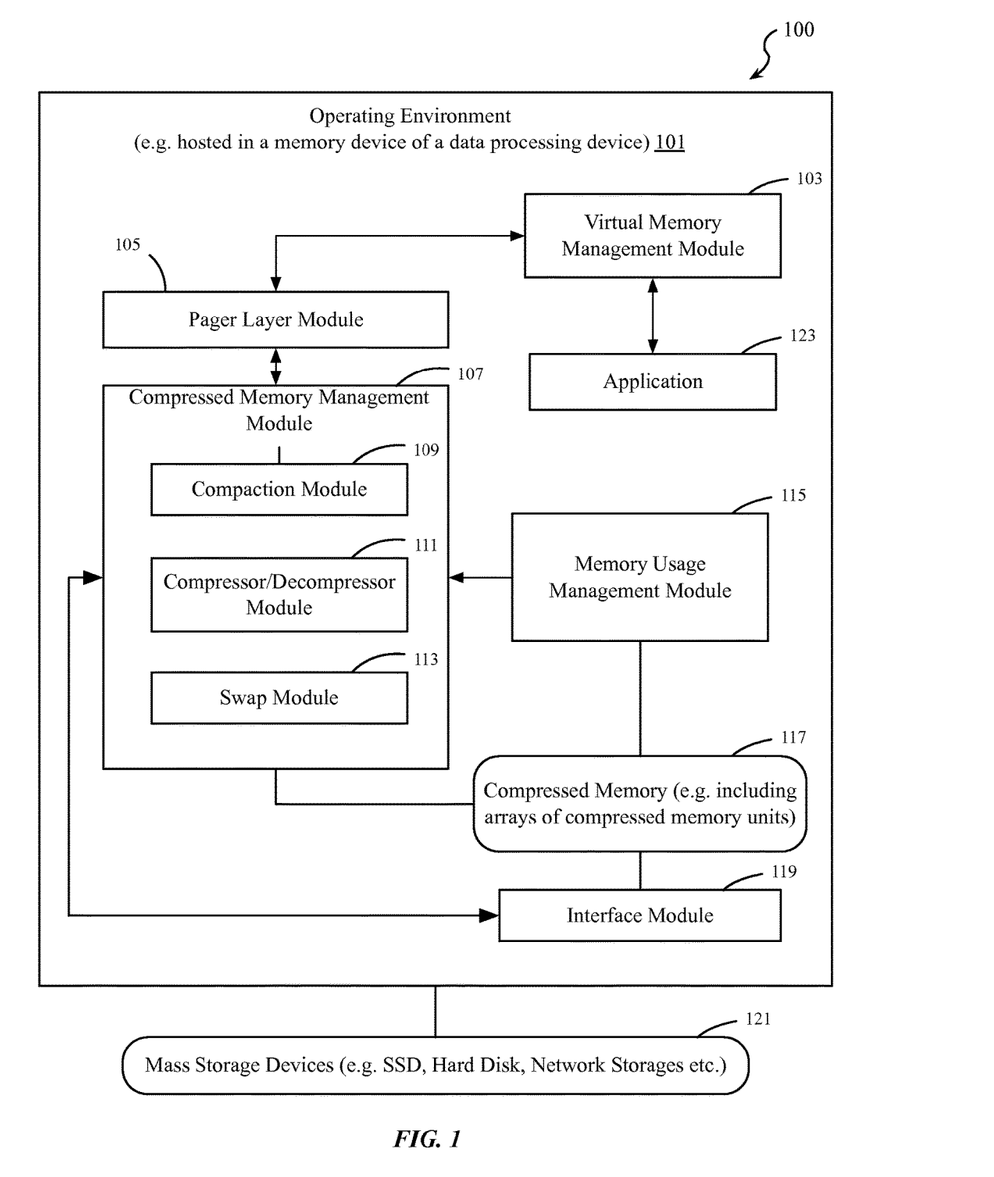
FIG. 1 is a block diagram illustrating one embodiment of a virtual memory system based on compressed and/or compacted memory.

FIG. 1 is a block diagram illustrating one embodiment of a virtual memory system based on compressed and/or compacted memory. For example, system 100 may include operating environment 101 hosted in a memory device of a data processing device, such as a mobile device, a desktop computer, or a server, etc. The memory device may comprise, for example, a random access memory (RAM) for supporting data processing of at least one processor in the processing device. Compressed memory (or compression pool) 117 may be dynamically partitioned (or maintained) within the memory device. As a result, available memory space in the memory device for supporting operations of operating environment 101, which may be based on the uncompressed portion of the memory device, may be less than the total memory space provided by the memory device. In certain embodiments, multiple processors, such as CPUs, GPUs or other applicable processing units, can access compressed memory 117 in parallel.

In one embodiment, virtual memory management module 103 may virtualize various forms of computer data storage, such as RAM and mass storage devices 121, to allow a program or process, such as application 123, running in operating environment 101 to access memory addresses (or virtual memory addresses) as though there is only one kind of memory, namely virtual memory, which can behave like directly addressable read/write memory in RAM. For example, virtual memory management module 103 can maintain mapping between virtual memory addresses (or a virtual memory address) and actual physical data storage locations, such as physical memory pages within the RAM (or memory device) and storage references in mass storage devices 121.

Virtual memory management module 103 may move data into or out of the memory device (e.g. RAM) via pager layer module 105. For example, data (e.g. anonymous data or dirty data not backed by a disk file in mass storage devices 121) may be swapped out of physical memory pages in the memory device to free up memory space in the physical memory pages in response to, for example, memory allocation requests from applications and/or other data processing requirements. Clean data (or memory data) which may be available from a disk file in mass storage devices 121 may be paged out (or purged) from the memory device to increase available memory space. When an application, such as application 123, terminates, memory space (e.g. stacks, heaps, etc.) allocated for the application may become available for future allocation.

In one embodiment, virtual memory management module 103 may send memory swapping in/out requests to pager layer module 105 to manage virtual memory addresses within uncompressed portion of the memory device. Pager layer module 105 may interface with mass storage devices 121 and/or compressed memory management module 107 to move memory pages to/from the uncompressed portion of the memory device. As a result, virtual memory management module 103 can map a virtual memory address outside of the uncompressed portion of the memory device without distinguishing (or knowledge of) whether the virtual memory address corresponds to a memory location within compressed memory 117 or mass storage devices 121. In other words, virtual memory management module 103 can be ignorant of the presence of compressed memory 117.

Pager layer module 105 may be based on multiple concurrent threads (or input/output threads) to perform memory paging operations. For example, pager layer module 105 may include a file pager to manage uncompressed memory pages storing clean data from disk files of mass storage devices 121. Pager layer module 105 may include memory pager (e.g. as one or more threads) interfacing with compressed memory management module 107 to move uncompressed memory pages to/from the uncompressed portion of the memory device via compressed memory 117.

In one embodiment, compressed memory 117 may include one or more log structures (e.g. based on an array or queue having a head and a tail) to store compressed memory units. Each log structure may include one or more segments with buffers allocated for storing compressed memory units. Each segment may be of a common size (e.g. 256 KB, 512 KB, 1024 KB, or other applicable sizes) with memory slots to store an ordered list of compressed memory units (or compressed pages). Each compressed unit maybe may be compressed from a memory page in the uncompressed portion of a memory device, e.g. via compressor/decompressor module 111 to the head of a log structure. In some embodiments, each log structure can be updated or operated via separate threads concurrently and/or independently via compressed memory management module 107.

A compressed memory unit may be stored in a memory slot (or position) in one segment of a log structure. Compressor module 111 can record or store newly compressed memory page to a head slot of a log structure and update the next slot (to the current head slot) as the head slot of the log structure for future compression. Compressed memory management module 107 may create (or allocate from the uncompressed portion of a memory device) one or more new segments when the current segment (or head segment in the log structure) becomes full (or substantially full). A mapping between a memory page and its corresponding compressed memory unit in a log structure may be maintained for compressed memory 117, for example, based on identifiers identifying a log structure, a segment within the identified log structure and a memory slot within the identified segment storing the compressed memory unit.

In one embodiment, compressor/decompressor module 111 can manage log structures in compressed memory 117. Each log structure may be associated with a recording head which may point to a head slot in a current segment, e.g. head segment in an array of segments in the log structure. Multiple threads may be associated with compressor/decompressor module 111 to perform memory compress/decompress operations using separate log structures concurrently. Compressor/decompressor module 111 may perform compressing operations according to a request queue storing memory pages to be compressed, for example, as scheduled via pager layer module 105. A memory page when compressed may require less than one page of physical memory size to be stored in a memory slot within a segment in a log structure.

In one embodiment, as more memory pages are compressed into compressed memory 117, memory slots may be filled up following the head of corresponding log structure. Alternatively, some segments or slots in the segments in the corresponding log structure may become empty or available for allocation when the stored compressed memory units are released. For example, when an application or process terminates, objects or structures maintained for the application may be removed and physical memory pages or compressed memory units owned by the application may be released for future use (i.e. available for allocation). Alternatively, segments may become empty as a result of being swapped out, decompressed or compacted.

Compressor/decompressor module 111 may pull or decompress compressed memory units out of compressed memory 117 to the uncompressed portion of a memory device, for example, in response to page faults encountered in virtual memory management module 103. Compressor/decompressor module 111 may perform compressing and decompressing operations concurrently on different segments of compressed memory 117, for example, via separate threads.

Compressed memory management module 107 can include swap module 113 to move segments of compressed memory units between compressed memory 117 and mass storage device 121 via interface module 119. For example, segments of compressed memory units may be swapped out of compressed memory 117 to make room for accommodating newly compressed memory pages, and/or to store a state of the memory device for future recovery during system hibernation process etc. Alternatively, a segment of compressed memory units may be swapped into compressed memory 117 because of page faults encountered in virtual memory management module 103 to access data in one or more of the segment of compressed memory units.

In one embodiment, one or more threads may be running for swap module 113. A swap thread may wake up according to a designated schedule or responding to requests. For example, pager layer module 105 may issue requests to resolve page faults. Memory usage management module 115 may send request to maintain enough available memory space in the memory device. According to one embodiment, a swap thread can wake up to examine the current state of the memory device to determine how many segments of compressed memory units to swap out of compressed memory 117. The swap thread can select a least used (e.g. aged or old) segment, compact it (e.g. via compaction module 109) if needed, and forward the selected segment to mass storage devices 121. Swapping operations via swap module 113 may be performed independent and/or concurrently with compression/decompression operations via compressor/decompressor module 111.

Compaction module 109 may perform compaction operations on compressed memory 117 to reduce memory fragmentation and/or to increase memory swapping efficiencies. For example, compaction module 109 can perform minor compaction operations to slide (or move) compressed memory units within a segment of a log structure without altering ordering relationship among the compressed memory units to consolidate empty memory slots left in between. Alternatively or optionally, compaction module 109 can perform major compaction operations to move compressed memory units across different segments to fill up and/or empty certain segments.

In one embodiment, swap module 113 may request compaction module 109 to compact segments (e.g. minimize or reduce empty slots) for better swapping performance. For example, the interface between a memory device and a swap device may be based on a fixed size data buffer for data transfer. A tightly packed segment matching the data buffer size can maximize transfer efficiency (e.g. amount of data transferred per unit time or clock cycle).

Memory usage management module 115 may determine when to push out or swap out compressed memory units or pages from compressed memory 117 to mass storage devices 121. Memory usage management module can monitor usage status of the memory device to provide triggers for (or send request to) swap module 113 to initiate swapping operations. Usage status may include power usage, memory performance (e.g. read/write speed), memory usage rate, ratio of compressed/uncompressed partitions in the memory device, size of compressed memory 117, size of working set of memory pages, or other applicable runtime measures, etc.

Figure 2:
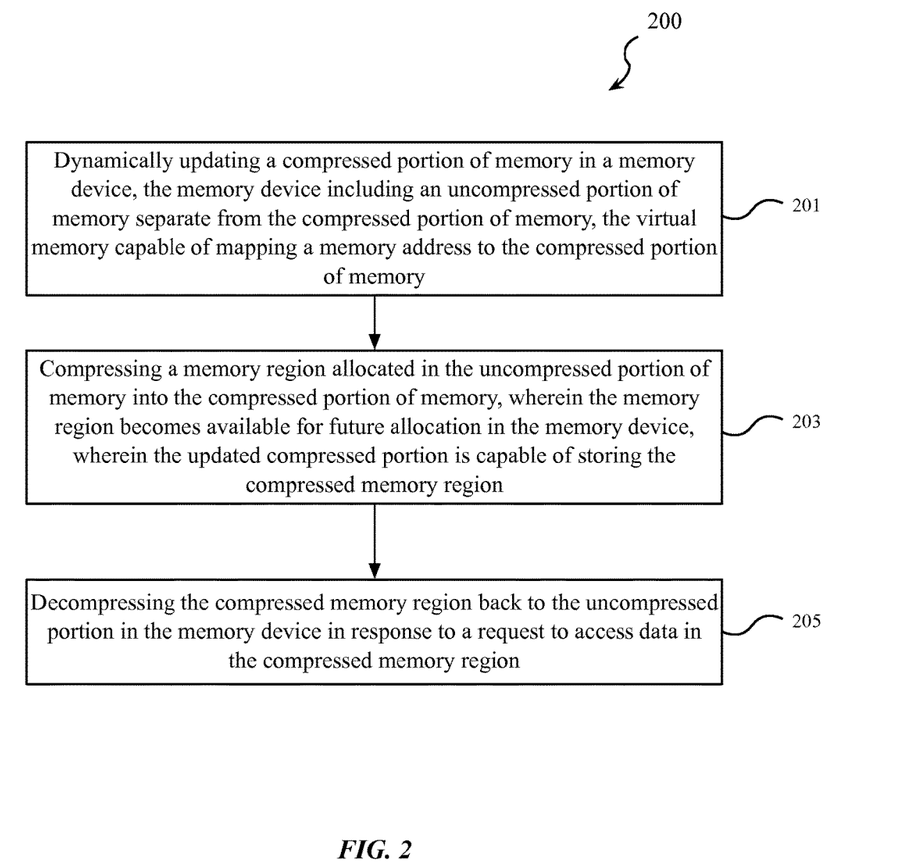
FIG. 2 is a flow diagram illustrating one embodiment of compressing and decompressing memory for a virtual memory.

FIG. 2 is a flow diagram illustrating one embodiment of compressing and decompressing memory for a virtual memory. For example, process 200 may be performed by some components of system 100 of FIG. 1. At block 201, the processing logic of process 200 can dynamically update a compressed portion of memory in a memory device for a virtual memory supporting one or more processors. The memory device can include an uncompressed portion of memory separate from the compressed portion of memory. A memory address in the virtual memory may be mapped into the compressed portion or the uncompressed portion of the memory.

In one embodiment, the compressed portion of memory may be updated with additional memory allocated from the uncompressed portion of memory. A memory region allocated in the uncompressed portion of memory may be compressed into the compressed portion of memory to allow the memory region to be available for future allocation in the uncompressed portion of memory of the memory device. The updated compressed portion of memory may be capable of storing the compressed memory region. The size of available memory for allocation in the uncompressed portion of memory may increase as a result of the compression of the memory region.

According to one embodiment, the compressed memory region may be decompressed back to the uncompressed portion in the memory device, for example, in response to receiving a request to access data in the compressed memory region. The processing logic of process 200 may determine if the requested data is currently available in the uncompressed portion of memory. If the requested data is not currently available in the uncompressed portion of memory, the request may cause a page fault event to trigger the update on the compressed portion of memory, e.g. to uncompress the compressed memory region.

The compressed portion of memory may be stored in multiple (or at least one) compressed memory units. Each compressed memory unit may correspond to a separate memory region compressed from the uncompressed portion of memory. Separate compressed memory units may not be stored consecutively (e.g. based on physical allocation within the memory device) in the compressed portion of memory. In one embodiment, the compressed portion of memory may be compacted to cause these separate compressed memory units to be stored consecutively in the compressed portion of memory.

A memory region may correspond to a memory unit of a fixed size, such as a page of memory, in the uncompressed portion of a memory device. A compressed memory unit may vary in size depending on, for example, amount or compression property of original data content compressed into the compressed memory unit. In one embodiment, a compressed memory region may correspond to a particular compressed memory unit in the compressed portion of memory.

In one embodiment, a particular compressed memory unit may be stored in between adjacent compressed memory units in the compressed portion of memory. When the particular compressed memory unit is removed from the compressed portion of memory, the adjacent memory units may be moved to be stored consecutively next to each other, e.g. via compaction operations. The particular compressed memory unit may be removed from the compressed portion of memory via, for example, decompression operation, swapping operations, or other applicable memory management operations.

In some embodiments, the compressed portion of memory may include multiple pools of memory slots. Each compressed memory unit may be stored in one or more consecutive (according to physical memory allocation) memory slots. Each pool may correspond to a separate partition of the compressed memory units. In one embodiment, each pool may be associated with a separate thread, e.g. belonging to a process running in a system using the memory. Compaction operations on the compressed portion of memory may be separately and asynchronously performed for each pool via its associated thread.

The memory device may be coupled with a separate storage device, such as a hard disk, a flash memory or other applicable non-volatile storage device. One or more of the compressed memory units may be swapped out to the separate storage device from the compressed portion of memory (e.g. to update the compressed portion of memory). As a result, the size of the compressed portion of memory may be decreased to increase the size of the uncompressed portion of memory. Alternatively, the compressed memory units for compressed memory regions may be swapped to the compressed portion of memory from the separate storage device if data in the compressed memory units are not currently available in the compressed portion of memory when requested.

The processing logic of process 200 may swap compressed memory units between the storage device (e.g. a swap device) and the memory device via an interface having a data transfer buffer, such as a bus buffer with a certain bit size. In one embodiment, the processing logic of process 200 may compact the compressed portion of memory to allow the data transfer buffer to efficiently carry multiple compressed memory units together, for example, with substantially full capacity in each hardware data transaction.

In one embodiment, the memory region may correspond to a memory page in the memory device. The uncompressed portion of memory can include a working set of memory pages to support currently active data processing processes. The working set of memory pages may be compressed into a series of compressed memory units in the compressed portion of memory, for example, in response to a hibernation request to temporarily halt operations of the system. The series of compressed memory units can then be swapped out to a storage device coupled with the memory device for future use.

The processing logic of process 200 can select at least one compressed memory units to swap out of the compressed portion of memory. The selection may be based on usage properties of the compressed memory units. The usage properties may indicate when data is accessed for the compressed memory units. For example, the usage properties may include time stamps or other meta data associated with a compressed memory unit to indicate when the compressed memory unit was accessed, created, compressed, swapped in, or used etc.

In one embodiment, the processing logic of process 200 may swap out the compressed memory units which are least likely to be used or requested for the working set, such as via a LRU strategy. The processing logic of process 200 may heuristically determine likelihood of the compressed memory units to be accessed in the near future based on associated usage properties. In one embodiment, the compressed memory units may be stored linearly with an order in the compressed portion of memory. The order may correspond to the usage properties (e.g. access time stamps) associated with the compressed memory units.

The compressed portion of memory may include one or more memory segments. Each memory segment can correspond to an array of one or more of the compressed memory units. The processing logic of process 200 can move or slide one or more compressed memory units within a particular memory segment for performing compaction operations to allow multiple compressed memory units to be stored in contiguous memory space within the particular memory segment.

In one embodiment, each memory segment can have a memory capacity and/or a usage rate. The usage rate can indicate how much of the memory capacity has been used to store a corresponding array of compressed memory units. The processing logic of process 200 can perform the compaction operations to move one or more of the compressed memory units across the memory segments to increase the usage rate of at least one of the memory segments. For example, a memory segment which is 60% full may become 99% full after the compaction operations.

Figure 3:
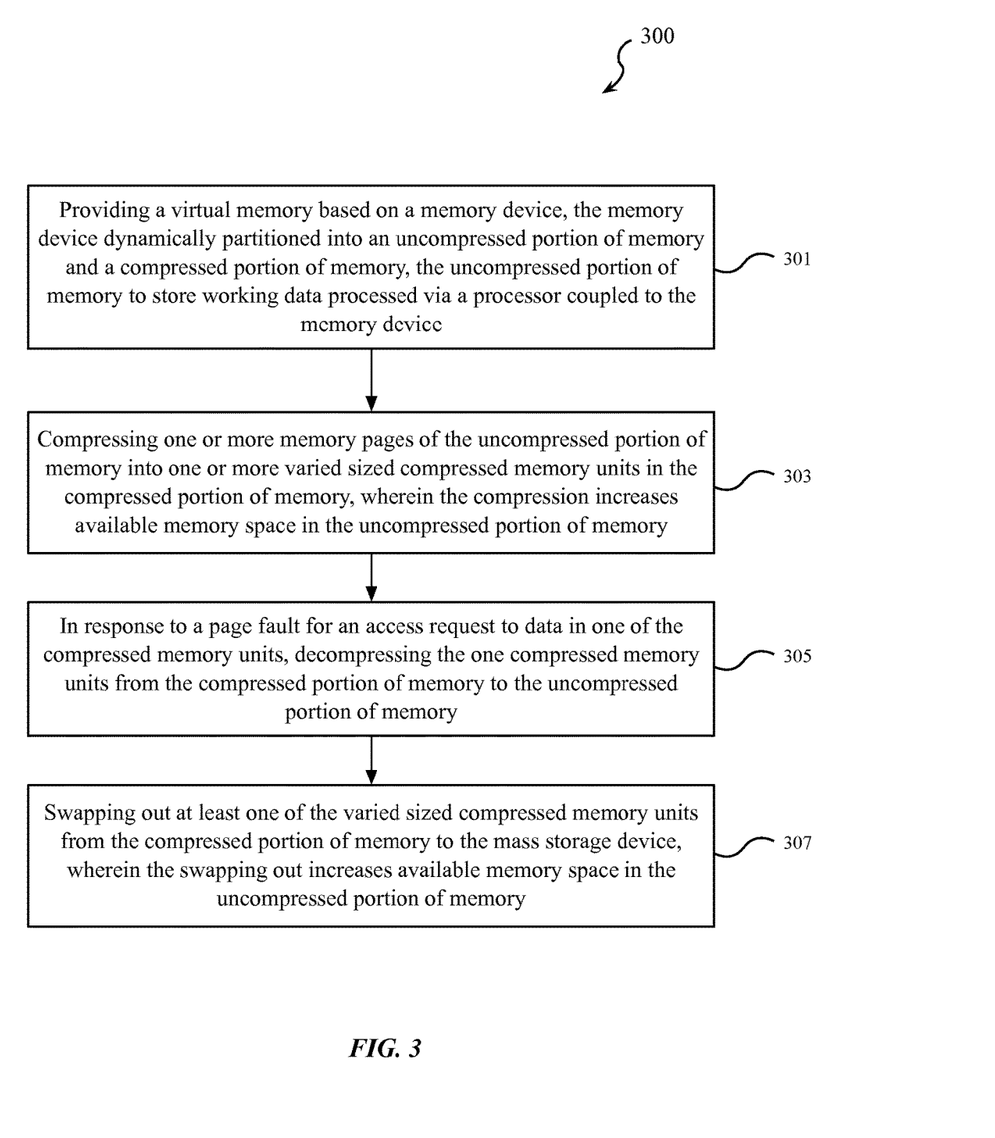
FIG. 3 is a flow diagram illustrating one embodiment of a process to swap compressed memory pages for a virtual memory.

FIG. 3 is a flow diagram illustrating one embodiment of a process to swap compressed memory pages for a virtual memory. For example, process 300 may be performed by some components of system 100 of FIG. 1. At block 301, the processing logic of process 300 can provide a virtual memory based on a memory device. The processing logic of process 300 may dynamically partition the memory device into an uncompressed portion (or layer) of memory and a compressed portion (or layer) of memory. A working set of memory space used to perform data processing tasks by one or more processors coupled to the memory device may be stored in the uncompressed portion of memory.

At block 303, the processing logic of process 300 can compress one or more memory pages of the uncompressed portion of memory into one or more varied sized compressed memory units in the compressed portion of memory. The compression can increase available memory space in the uncompressed portion of memory.

At block 305, the processing logic of process 300 can decompress a particular one of the compressed memory units from the compressed portion of memory to the uncompressed portion of memory, for example, in response to a page fault as a result of an access request to data in the particular compressed memory unit.

At block 307, the processing logic of process 300 may swap out at least one varied sized compressed memory unit from the compressed portion of memory to the mass storage device to increase available memory space in the uncompressed portion of memory, for example, to accommodate additional allocation requirement for the working set in the uncompressed portion of memory.

Figure 4:
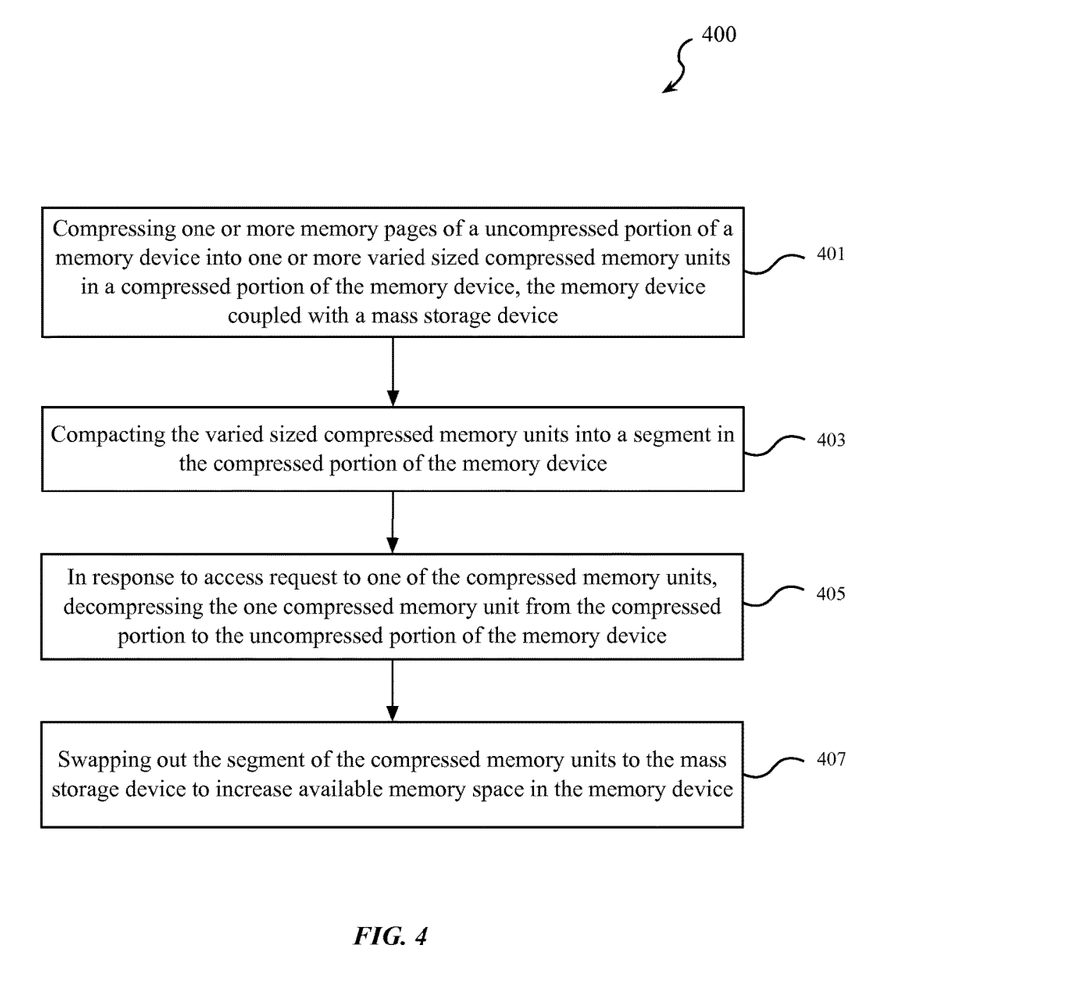
FIG. 4 is a flow diagram illustrating one embodiment of a process to swap a compacted segment of compressed memory for a virtual memory.

FIG. 4 is a flow diagram illustrating one embodiment of a process to swap a compacted segment of compressed memory for a virtual memory. For example, process 400 may be performed by some components of system 100 of FIG. 1. At block 401, the processing logic of process 400 can compress one or more memory pages of an uncompressed portion of a memory device into one or more varied sized compressed memory units in a compressed portion of the memory device. The memory device may be coupled with a mass storage device.

At block 403, the processing logic of process 400 may compact the varied sized compressed memory units into a segment or other applicable log structure data in the compressed portion of the memory device.

In response to receiving an access request to compressed data in one of the compressed memory units, at block 405, the processing logic of process 400 can decompress one or more compressed memory units, for example, from the segment in the compressed portion to the uncompressed portion of the memory device.

At block 407, the processing logic of process 400 can swap out the segment of the compressed memory units to the mass storage device to increase available memory space in the memory device.

Figure 5:
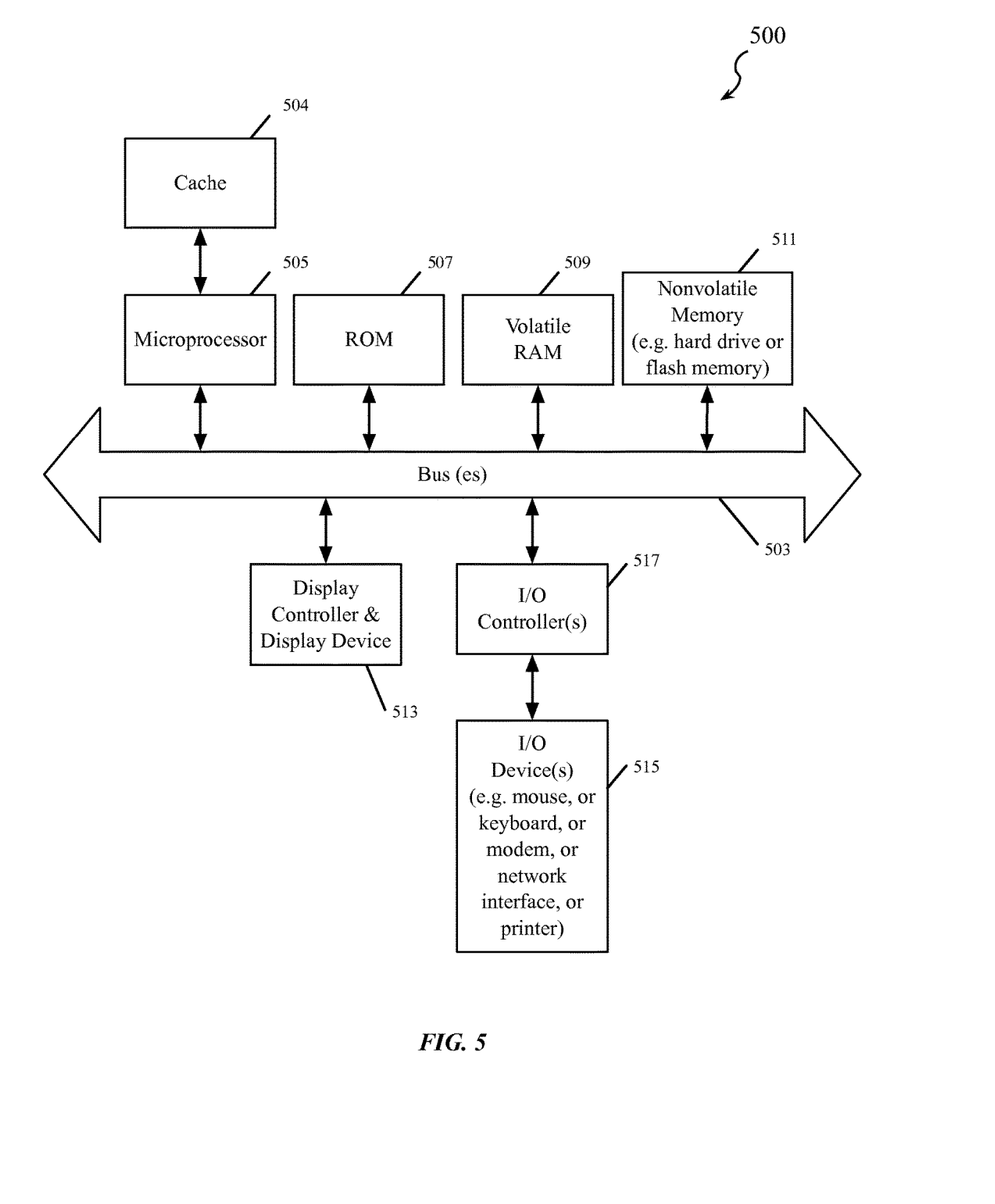
FIG. 5 illustrates one example of a data processing system such as a computer system, which may be used in conjunction with the embodiments described herein.

FIG. 5 shows one example of a data processing system, such as a computer system, which may be used with one embodiment the present invention. For example, system 1 of FIG. 1 may be implemented as a part of the system shown in FIG. 5. Note that while FIG. 5 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 5, the computer system 500, which is a form of a data processing system, includes a bus 503 which is coupled to a microprocessor(s) 505 and a ROM (Read Only Memory) 507 and volatile RAM 509 and a non-volatile memory 511. The microprocessor 505 may retrieve the instructions from the memories 507, 509, 511 and execute the instructions to perform operations described above. The microprocessor(s) 505 may be coupled with a cache 504. The bus 503 interconnects these various components together and also interconnects these components 505, 507, 509, and 511 to a display controller and display device 513 and to peripheral devices such as input/output (I/O) devices which may be mice, keyboards, modems, network interfaces, printers and other devices which are well known in the art. Typically, the input/output devices 515 are coupled to the system through input/output controllers 517. The volatile RAM (Random Access Memory) 509 is typically implemented as dynamic RAM (DRAM) which requires power continually in order to refresh or maintain the data in the memory.

The mass storage 511 is typically a magnetic hard drive or a magnetic optical drive or an optical drive or a DVD RAM or a flash memory or other types of memory systems which maintain data (e.g. large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 503 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transient storage medium having instructions stored therein, which when executed by a computer, cause the computer to perform a method comprising:

maintaining a working memory space in an uncompressed portion of memory in a memory device for a virtual memory, the memory device coupled with a separate storage device, the memory device including the uncompressed portion of memory and a separate compressed portion of memory;

mapping, for an application, a memory region allocated in the uncompressed portion of memory to a directly addressable virtual memory address in the compressed portion of memory;

compressing the memory region allocated in the uncompressed portion of memory into a compressed memory region in the compressed portion of memory, wherein the memory region in the uncompressed portion of memory becomes available for future allocation in the memory device;

receiving a request to access data in the compressed memory region causing a virtual memory address page fault which indicates the data is not available in the uncompressed portion of memory;

in response to the virtual memory address page fault, swapping in the compressed memory region from the separate storage device directly to the compressed portion of memory, without decompression, if the data of the compressed memory region is not currently available in the compressed portion of memory; and in response to the request to access data in the compressed memory region, decompressing the compressed memory region back to the uncompressed portion in the memory device, wherein at least one of the compressing the memory region and decompressing the compressed memory region is performed concurrently with at least one other compression/decompression operation with multiple concurrent threads each using separate log structures, and each log structure includes one or more segments storing one or more compressed memory units.

2. The medium of claim 1, further comprising:

detecting a condition to page out compressed data from the compressed portion of memory, wherein the compressed portion of memory is allowed to grow before the condition is detected, and wherein the compressed data is not paged out if the working memory space can be maintained within the uncompressed portion of memory; and paging out the compressed data from the compressed portion of memory to the storage device in response to the detection of the condition.

3. The medium of claim 2, wherein the maintaining comprises:

allocating additional memory from the uncompressed portion of memory for the compressed portion of memory, wherein a size of available memory for allocation in the uncompressed portion of memory is increased as a result of the compression of the memory region.

4. The medium of claim 3, wherein the compressed portion of memory stores a plurality of compressed memory units, each compressed memory unit corresponding to a separate memory region compressed from the uncompressed portion of memory, wherein at least two of the compressed memory units are not stored consecutively in the compressed portion of memory, further comprising:

compacting the compressed portion of memory, wherein the compacting causes the at least two of the compressed memory units to be stored consecutively in the compressed portion of memory.

5. The medium of claim 4, wherein the compressed memory region corresponds to a particular compressed memory unit in the compressed portion of memory, wherein the particular compressed memory unit was stored in between the at least two compressed memory units, wherein the decompression removes the particular compressed memory unit from the compressed portion of memory to allow the at least two of the compressed memory units to be stored consecutively.

6. The medium of claim 5, wherein the paging out the compressed data from the compressed portion of memory comprises:

swapping out one or more of the compressed memory units from the compressed portion of memory to the separate storage device, wherein the swapping out causes a decrease in size of the compressed portion of memory to increase size of the uncompressed portion of memory.

7. The medium of claim 6, further comprising:

determining if the data of the compressed memory region for the request is currently available in the compressed portion of memory, wherein the compressed memory region is decompressed if the data of the compressed memory region is currently available in the compressed portion of memory.

8. The medium of claim 7, wherein compressing the memory region allocated in the uncompressed portion of memory into the compressed portion of memory further comprises:

compressing one or more memory pages of the memory region into one or more varied sized compressed memory units in the compressed portion of the memory device, wherein the separate storage device is a mass storage device and the memory device is coupled with the mass storage device via an interface bus; and compacting the one or more varied sized compressed memory units into a fixed size segment in the compressed portion of the memory device, the size of the segment fixed according to a size of a data transfer buffer of the interface bus.

9. The medium of claim 6, wherein a particular one of the one or more of the compressed memory units was stored in between the at least two compressed memory units, wherein the swapping out removes the particular compressed memory unit from the compressed portion of memory to allow the at least two of the compressed memory units to be stored consecutively.

10. The medium of claim 6, wherein the swapping out comprises:
   selecting the one or more of the compressed memory units for the swapping and wherein the selection is based on usage properties associated with the compressed memory units.

11. The medium of claim 10, wherein the memory region corresponds to a memory unit of a fixed size in the memory device and the compressed memory units are of varied sizes.

12. The medium of claim 11, wherein the compressed memory units are stored in the compressed portion of memory in an order corresponding with one or more usage properties associated with the compressed memory units.

13. The medium of claim 12, wherein usage properties indicate when data is accessed for the compressed memory units and wherein the one or more of the compressed memory units selected are least recently used according to the order for the selection.

14. The medium of claim 11, wherein the memory device is coupled with the separate storage device via an interface having a data transfer buffer, wherein the swapping is based on data transfer over the interface via the data transfer buffer, and wherein the compaction allows the data transfer buffer to carry a plurality of the compressed memory units together.

15. The medium of claim 11, wherein the compressed portion of memory includes one or more memory segments, each memory segment corresponds to an array of one or more of the compressed memory units, and a particular memory segment includes two or more compressed memory units, the compacting comprises:
   moving at least one of the compressed memory units within the particular memory segment such that the two or more compressed memory units are stored in contiguous memory space within the particular memory segment.

16. The medium of claim 15, wherein each memory segment has a memory capacity, each memory segment having a usage rate indicating how much of the memory capacity has been used to store corresponding array of compressed memory units, the compacting further comprising:
   moving one or more of the compressed memory units across the memory segments, wherein corresponding usage rate of at least one of the memory segments increases as a result the moving of the one or more of the compressed memory units.

17. The medium of claim 4, wherein the compressed portion of memory includes multiple pools of memory slots, each compressed memory unit stored in one or more consecutive pools of memory slots, each pool corresponding to a separate partition of the compressed memory units, each pool is associated with a separate processor thread and wherein the compaction is separately and asynchronously performed for each pool via an associated processor thread.

18. The medium of claim 6, wherein the memory region corresponds to a memory page in the memory device, wherein the working memory space includes a working set of memory pages to support currently active data processing processes, further comprising:
   in response to a hibernation request, compressing the working set of memory pages to a series of compressed memory units in the compressed portion of memory; and
   swapping out the series of compressed memory units to the storage device.

19. The medium of claim 1, further comprising:
   swapping out the compressed memory region to the separate storage device, wherein the swapping out includes performing a first compaction to move compressed memory units of the compressed memory region across different fixed size memory segments to satisfy a predetermined fill threshold for the memory segments, wherein the fixed size is determined according to a size of a data transfer buffer of an interface bus coupling the memory device to the separate storage device.

20. The medium of claim 19, wherein swapping out the compressed memory region further includes:
   performing a second compaction to consolidate the compressed memory units within a respective memory segment without altering the ordering relationship among the compressed memory units.

21. The medium as in claim 20, wherein con pressing the memory region further includes:
   adding the compressed memory units into a head of a log structure in the compressed portion of memory, wherein each memory segment of the log structure corresponds to an array of one or more of the compressed memory units.

22. A machine-readable non-transient storage medium having instructions stored therein, which when executed by a computer, cause the computer to perform a method comprising:
   providing a virtual memory based on a memory device coupled with a storage device, the memory device dynamically partitioned into an uncompressed portion of memory and a compressed portion of memory, the uncompressed portion of memory to store working data processed via a processor coupled to the memory device;
   mapping, for an application, one or more memory pages allocated in the uncompressed portion of memory to one or more directly addressable virtual memory addresses in the compressed portion of memory;
   compressing the one or more memory pages of the uncompressed portion of memory into one or more varied sized compressed memory units mapped to the one or more virtual memory addresses in the compressed portion of memory, wherein the compression increases available memory space in the uncompressed portion of memory;
   receiving a request to access data in a compressed memory unit of the one or more compressed memory units, wherein the request causes a virtual memory page fault;
   in response to the virtual memory page fault, swapping in the one or more varied sized compressed memory units from a separate storage device directly to the compressed portion of memory, without decompression, if the data of the compressed memory units is not currently available in the compressed portion of memory;

in response to the request to access data in the compressed memory unit, decompressing the one or more varied sized compressed memory units from the compressed portion of memory to the uncompressed portion of memory, wherein at least one of the compressing the one or more memory pages and decompressing the one or more varied sized compressed memory units is performed concurrently with at least one other compression/decompression operation with multiple concurrent threads each using separate log structures, and each log structure includes one or more segments storing one or more compressed memory units;

detecting a condition indicating to page out compressed data from the compressed portion of memory, wherein the compressed portion memory is allowed to grow before the condition is detected, and wherein the compressed data is not paged out if the working data can be maintained within the uncompressed portion of memory; and swapping out the at least one of the one or more varied sized compressed memory units to the storage device in response to the detection of the condition.

23. A machine-readable non-transient storage medium having instructions stored therein, which when executed by a computer, cause the computer to perform a method comprising:

mapping, for an application, one or more memory pages allocated in an uncompressed portion of a memory device to one or more directly addressable virtual memory addresses in a compressed portion of memory;

compressing the one or more memory pages in the uncompressed portion of the memory device into one or more varied sized compressed memory units in a compressed portion of the memory device, the memory device coupled with a mass storage device via an interface bus, wherein working data is dynamically maintained within the uncompressed portion of the memory device;

compacting the one or more varied sized compressed memory units into a fixed size segment in the compressed portion of the memory device, the size of the segment fixed according to a size of a data transfer buffer of the interface bus;

in response to a virtual memory address page fault for an access request to a compressed memory unit of the one or more compressed memory units, swapping in the compressed unit from the separate storage device directly to the compressed portion of memory, without decompression, and decompressing the compressed memory unit from the compressed portion to the uncompressed portion of the memory device, wherein at least one of the compressing the one or more memory pages and decompressing the compressed memory unit is performed concurrently with at least one other compression/decompression operation with multiple concurrent threads each using separate log structures, and each log structure includes one or more segments storing one or more compressed memory units;

detecting a condition to page out compressed data from the compressed portion of the memory device, wherein the compressed portion of the memory device is allowed to grow before the condition is detected, and wherein the compressed data is not paged out if working data can be maintained within the uncompressed portion of the memory device; and swapping out, in response to the detection of the condition, the segment of compressed memory units to the mass storage device.

24. A computer implemented method comprising:

maintaining a working memory space in an uncompressed portion of memory in a memory device, the memory device coupled with a separate storage device, the memory device including a compressed portion of memory separate from the uncompressed portion of memory capable of supporting data processing for at least one processor;

mapping, for an application, a memory region allocated in the uncompressed portion of memory to a directly addressable virtual memory address in the compressed portion of memory;

compressing a memory region allocated in the uncompressed portion of memory into a compressed memory region in the compressed portion of memory, wherein the memory region in the uncompressed portion of memory becomes available for future allocation in the memory device; and receiving a request to access data in the compressed memory region, wherein the request causes a virtual memory address page fault which indicates the data is not available in the uncompressed portion of memory;

in response to the virtual memory address page fault, swapping in the compressed memory region from the separate storage device directly to the compressed portion of memory, without decompression, if the data of the compressed memory region is not currently available in the compressed portion of memory;

decompressing the compressed memory region back to the uncompressed portion in the memory device, wherein at least one of the compressing the memory region and decompressing the compressed memory region is performed concurrently with at least one other compression/decompression operation with multiple concurrent threads each using separate log structures, and each log structure includes one or more segments storing one or more compressed memory units;

detecting a condition to page out compressed data from the compressed portion of memory, wherein the compressed portion of memory is allowed to grow before the condition is detected, and wherein the compressed data is not paged out if the working memory space can be maintained within the uncompressed portion of memory; and paging out the compressed data from the compressed portion of memory to the storage device, in response to the detection of the condition.

25. A computer system comprising:

a memory including executable instructions, the memory dynamically partitioned based on runtime memory access patterns into a compressed portion of memory and an uncompressed portion of memory, the uncompressed portion of memory including a working memory space;

a mass storage device coupled to the memory via an interface bus; and a processor coupled to the memory and the mass storage device, the processor to execute the executable instructions from the memory, the processor being configured to, map, for an application, an uncompressed memory region allocated in an uncompressed portion of the memory to one or more directly addressable virtual memory addresses in the compressed portion of memory;

compress the memory region into one or more varied sized compressed memory units to create a compressed memory region in the compressed portion of memory, wherein the memory region in the uncompressed portion of memory becomes available for future allocation in the memory device, in response to a request to access data in the compressed memory region, swap in the compressed memory region from the separate storage device directly to the compressed portion of memory, without decompression, and decompress the compressed memory region back to the uncompressed portion in the memory device, wherein at least one of the compressing of the memory region and decompressing the of compressed memory region is performed concurrently with at least one other compression/decompression operation with multiple concurrent threads each using separate log structures, and each log structure includes one or more segments storing one or more compressed memory units, compact the one or more varied sized compressed memory units into a fixed size segment in the compressed portion of the memory device, the size of the segment fixed according to a size of a data transfer buffer of the interface bus; and in response to detection of a high memory usage in the memory device, swap out the compressed memory region to the storage device to increase available memory space in the memory device.

26. A non-transitory computer-readable storage medium having instructions stored therein, which when executed by one or more processors, cause the one or more processors to perform operations comprising:

maintaining a working memory space in an uncompressed portion of memory in a memory device for a virtual memory, the memory device coupled with a mass storage device, the memory device including the uncompressed portion of memory and a separate compressed portion of memory;

mapping, for an application, a memory region allocated in the uncompressed portion of memory to a directly addressable virtual memory address in the compressed portion of memory;

compressing one or more pages of the memory region allocated in the uncompressed portion of memory into a compressed memory region of varied sized compressed memory units in the compressed portion of memory, wherein the memory region allocated in the uncompressed portion of memory becomes available for future allocation in the memory device, wherein the memory device is coupled with the mass storage device via an interface bus;

in response to a request to access data in the compressed memory region, swapping in the compressed memory region from the separate storage device directly to the compressed portion of memory and without decompression, and decompressing the compressed memory region back to the uncompressed portion in the memory device, wherein at least one of the compressing the memory region and decompressing the compressed memory region is performed concurrently with at least one other compression/decompression operation with multiple concurrent threads each using separate log structures, and each log structure includes one or more segments storing one or more compressed memory units;

compacting the one or more varied sized compressed memory units into a fixed size segment in the compressed portion of the memory device, the size of the segment fixed according to a size of a data transfer buffer of the interface bus; and swapping out the fixed size segment compacted from the one or more varied sized compressed memory units to the mass storage device via the interface bus without decompressing the compressed memory units.

27. The medium as in claim 26, wherein compressing one or more memory pages of the memory region into one or more varied sized compressed memory units includes compressing the compressed memory units into the head of a log structure in the compressed portion of the memory in the memory device.

28. The medium as in claim 27, wherein the log structure includes one or more memory segments, each memory segment corresponds to an array of one or more of the compressed memory units.

29. The medium as in claim 28, further comprising instructions to perform additional operations comprising updating the log structure via separate processor threads of a compressed memory management module.

30. The medium as in claim 29, wherein updating the log structure includes compacting the one or more memory segments of the log structure to reduce holes within the one or more memory segments.

* * * * *